United States Patent

Wutz et al.

[11] Patent Number: 6,150,437
[45] Date of Patent: Nov. 21, 2000

[54] FLOW IMPROVING AGENTS FOR BINDER SUSPENSIONS CONTAINING CEMENT

[75] Inventors: Konrad Wutz, Trostberg; Alfred Kern, Kirchweidach; Josef Weichmann, Pleiskirchen, all of Germany

[73] Assignee: SKW Trostberg Aktiengesellschaft, Trostberg, Germany

[21] Appl. No.: 08/478,331

[22] Filed: Jun. 7, 1995

[30] Foreign Application Priority Data

Jun. 21, 1994 [DE] Germany ............................. 44 21 722

[51] Int. Cl.⁷ .......................... C04B 24/32; C04B 24/30; C08L 51/08
[52] U.S. Cl. ..................... 524/26; 524/4; 524/5; 524/25; 524/704; 524/846; 524/377; 528/393; 525/404; 525/411; 525/412; 252/174.22; 106/655; 106/728; 106/810
[58] Field of Search ................... 524/4, 5, 25, 26, 524/704, 846, 377; 525/404, 411, 412; 528/393; 252/174.22; 106/810, 728, 655

[56] References Cited

U.S. PATENT DOCUMENTS

| | | | |
|---|---|---|---|
| 2,221,431 | 11/1940 | Omansky | 524/25 |
| 4,471,100 | 9/1984 | Tsubakimoto et al. | 524/599 |
| 4,814,014 | 3/1989 | Arfaei | 524/5 |
| 5,142,036 | 8/1992 | Akimoto et al. | 526/271 |

FOREIGN PATENT DOCUMENTS

| | | | |
|---|---|---|---|
| 0306449 | 3/1989 | European Pat. Off. | 524/5 |
| 0645291 | 10/1950 | United Kingdom | 524/26 |

*Primary Examiner*—Andrew E. C. Merriam
*Attorney, Agent, or Firm*—Felfe & Lynch

[57] ABSTRACT

Flow improving agents for binder suspensions containing cement are described, which consist of:

a) Graft polymers which have been prepared by radical grafting of a polyalkylene oxide of the general formula (I) with an ethylenically unsaturated mono- or dicarboxylic acid or the anhydride thereof, and then by derivatizing with a primary or secondary amine and/or alcohol, and also of b) Casein.

These flow improving agents have the advantage that the ability to flow is considerably improved in comparison, for example, with casein alone, and the improved ability to flow is preserved over a longer period of time.

27 Claims, No Drawings

FLOW IMPROVING AGENTS FOR BINDER SUSPENSIONS CONTAINING CEMENT

The subject matter of the present invention is flow improvers for binder suspensions based on casein and containing cement, especially for self-leveling spreading compositions.

It is known to use casein as a flow improving agent for binder suspensions containing cement, the casein being used on account of its good flowing and spreading properties, particularly in the case of self-spreading smoothing compositions. The special advantages of casein consist in this case in its good liquefying action, which is stable over a relatively long period of time, and this is especially important in regard to the workability of the flow coat.

A disadvantage of casein, however, is its degradability by biological processes, e.g., by bacteria, and the cleavage products that result can furthermore create bad odors. Another disadvantage of the use of casein is the liability of binder suspensions containing cement to become mildewed. For this reason there has long been a need for replacing casein at least in part with other flow improving agents.

There has been no lack of attempts to improve the flowing properties of casein in such binder suspensions containing cement by adding other liquefiers, based for example on sulfonated melamine- or naphthalene-formaldehyde condensation products (known as MSF or NSF resins). It has been found, however, that these flow improvers are not combinable with casein, i.e., they result in an impairment of the flow qualities of the casein.

The present invention was therefore addressed to the problem of developing flow improvers which would not have the named disadvantages of the state of the art, but would have good industrial application characteristics especially for self-spreading smoothing compositions.

This problem has been solved according to the invention by providing the flow improving agent consisting of a) graft polymers in accordance with claim 1 and b) casein. For it has been found surprisingly that by the combination according to the invention the flowing properties of the casein can also be decidedly improved over a longer period of time.

The flow improving agents according to the present invention consist of two components a) and b). Component a) is represented by water-soluble graft polymers which are defined by their process of preparation which comprises at least two steps. In the first reaction step the radical grafting of a polyalkylene oxide of the general formula (I)

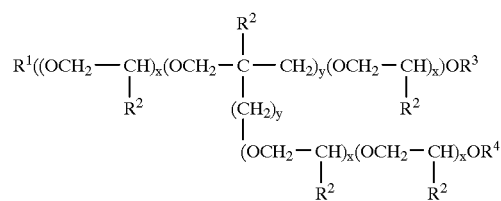

wherein

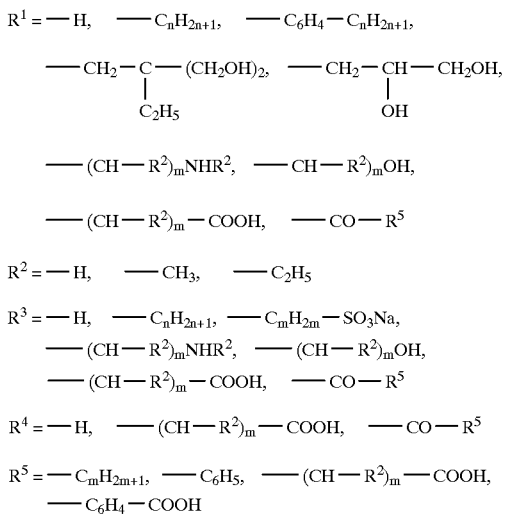

$n = 1\text{-}18 \quad m = 1\text{-}5 \quad x = 2\text{-}200 \quad y = 0,1$ with an ethylenically unsaturated mono- or dicarboxylic acid or its anhydride.

In the polyalkylene oxides used according to the invention, which form the main chain of the graft polymer, the alkylene moieties can be entirely linear ($R^2$=H), as in the case of polyethylene glycol, or else branched ($R^2$=CH$_3$, C$_2$H$_5$), as in the case of polypropylene glycol for example. Polyethylene glycol, polypropylene glycol, polyethylene triol and polypropylene triol of their copolymers is to be considered as preferred. The polyalkylene oxides can preferably be etherified at the beginning or end of the chain with aliphatic or araliphatic moieties, the corresponding aliphatic moieties consisting of 1 to 18 carbon atoms. The aliphatic moieties can furthermore also contain functional groups, such as hydroxyl, sulfonate, amino or carboxyl functions.

It is also possible within the scope of the invention to acylate the free OH groups of the polyalkylene oxides prior to grafting by reaction with corresponding acid chlorides or anhydrides, it being preferred to resort to the technically important carboxylic acid anhydrides of monocarboxylic acids such as acetic anhydride, propionic acid anhydride, or of dicarboxylic acids such as succinic acid anhydride, glutaric acid anhydride or phthalic acid anhydride as the acylating agent. The acylation can of course also be performed without any problems with the corresponding acid chlorides such as benzoyl chloride.

Ethylenically unsaturated mono- or dicarboxylic acids or their anhydrides can then be grafted onto these polyalkylene oxides, thus forming the side branches of the corresponding graft polymers. The ethylenically unsaturated mono- or dicarboxylic acids used can be aliphatic derivatives such as acrylic acid, methacrylic acid, maleic acid, fumaric acid or itaconic acid, but cyclic derivatives such as tetrahydrophthalic acid, for example, can also be used. Instead of the mono- or dicarboxylic acid the anhydride can be used, such as for example maleic acid anhydride or itaconic acid anhydride.

The ratio by weight of polyalkylene oxide to the ethylenically unsaturated mono- or dicarboxylic acid or its anhydride can vary widely. Preferably, however, these starting compounds are used in such amount that their weight ratio ranges from 98:2 to 20:80.

The radical graft polymerization itself is relatively uncritical and can be performed according to usual processes with the known radical starters. Suitable starters are peroxy compounds, azo compounds and redox initiators, which are commonly used in graft polymerization. Typical examples are TBPTH, TBPEH (tertbutyl-peroxy-2-ethyl-hexanoate, DCP (dicumyl peroxide), and DEPH (2,5-dimethyl 2,5-di(2-ethylhexanoylperoxy)hexane. The poymerization itself is preferably performed at a temperature of 50 to 180° C. and is governed essentially by the degradation temperature of the starter used.

After the graft polymerization the carboxylic acid or anhydride functions can be partially converted to the salt form by reaction with bases. This saponification reaction is recommendable when carboxylic acid anhydrides are used in the grafting. It can be performed with the common basically acting substances, such as alkali, alkaline earth or ammonia, for example. Depending on the desired degree of saponification, preferably 0.5 to 2 moles of base are used with respect to the mono or dicarboxylic acid. It is of course also easily possible to add the basic compounds at a later time, i.e., during or after the derivatization, the pH of the graft polymers being set preferably at about 7.0 to 8.5.

The polymers used according to the invention are subjected, after the graft polymerization, to a derivatization of the acid functions by reaction with a primary or secondary amine and/or alcohol. For the derivatization, basically any primary or secondary amines can be used, which preferably have aliphatic, araliphatic, aromatic or heterocyclic moiety. The aliphatic moieties in this case can be saturated or unsaturated, linear or branched, the hydrocarbon moieties having preferably 1 to 18 carbon atoms. In addition to the aliphatic amines, aromatic derivatives such as aniline, and cyclic derivatives such as piperidine or heterocyclic derivatives such as morpholine, can be used. It is furthermore possible for the moieties of the primary or secondary amine to carry also functional groups, such as —OH, —OR, —NH$_2$, NR$^2{}_2$, SO$_3$H, SO$_3$Na, —COOH, —COONa etc. Preferred amines with such functional groups are, for example, sulfanilic acid, 2-aminoethanesulfonic acid, and glutaminic acid or the salts thereof. Especially polyfunctional amines such as ethylenediamine, diethylenetriamine or triethylenetetramine can also be used as amine components.

In addition to the amines or instead of the amines, primary or secondary alcohols which have preferably aliphatic, araliphatic, cyclic or aromatic moieties can be used for the derivatization. The aliphatic moiety in this case can also be saturated or unsaturated, linear or branched, and especially it can have hydrocarbon moieties of 1 to 18 carbon atoms.

As described in the case of the amine component, the corresponding primary or secondary alcohols can also bear functional groups, as for example hydroxyl, alkoxy, amino, carboxyl or sulfonic acid groups. Instead of the acids in question, the corresponding salts can also be used.

Within the scope of the present invention, cyclic alcohols, such as cyclopentanol or cyclohexanol, as well as aromatic alcohols such as phenol, can also be used. According to a preferred embodiment, polyalkyleneglycolmonoalkyl ether

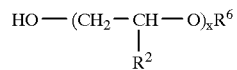

can be used as alcohol component, wherein x=1 to 100 and R$^6$=C$_n$H$_{2n+1}$, or C$_6$H$_4$—C$_n$H$_{2n+a}$, with n=1 –10. By means of this alcohol component the corresponding graft polymers become easily fluid and thus easy to stir, even at room temperature. Moreover, the water-solubility is definitely increased by the introduction of ethylene oxide groups.

The amount of the alcohol and/or amine component necessary for the derivatization is governed essentially by the amount of the carboxylic acid derivatives used. Preferably, the amine or alcohol component is used in such an amount that the molar ratio of ethylenically unsaturated mono- or dicarboxylic acid or its anhydride to the primary or secondary amine or alcohol ranges from 99:1 to 50:50.

The reaction conditions for the derivatization step are relatively uncritical and depend largely on the nature of the starting components.

Depending on the viscosity of the corresponding graft polymer, the derivatization can be performed either without solvent, or in an organic solvent (such as DMF) or else preferably in water; the operation can be performed in a wide temperature range from 20 to 200° C.

Since even after this derivatization the graft polymers used according to the invention may still contain a certain percentage of ethylenically unsaturated groups of the carboxylic acid derivatives, e.g., in the form of esters, it is also possible within the scope of the present invention to perform additionally a radical or nucleophilic addition onto these residual ethylenically unsaturated groups of the carboxylic acid derivatives. The nucleophilic addition in this case is performed before or after the derivatization, preferably by reaction with alkali sulfites, such as sodium sulfite, sodium bisulfite, or the like.

The radical addition, which can be initiated with the conventional starters, is preferably performed with vinyl or acryl derivatives; among the vinyl derivatives, N-vinylpyrrolidone, vinylsulfonic acid or styrene have proven to be especially good. Among the acryl derivatives, acrylic acid, acrylic acid amide or acrylic acid ester or the corresponding methacrylic acid derivatives are to be considered as preferred, yet other acrylic acid derivatives can also be employed.

The amount of the reagents used for the radical or nucleophilic addition depends essentially, of course, on the number of residual ethylenically unsaturated groups in the graft polymers. Preferably, these reagents are used in an amount of 0.1 to 50 mol-% with respect to the amount of the ethylenically unsaturated mono- or dicarboxylic acids or their anhydrides that is used.

It has proven to be especially advantageous to perform this radical or nucleophilic addition in an aqueous medium at a temperature of 20 to 120° C.

The graft polymers according to the invention can occur in the form of powder, a more or less highly viscous liquid, or an aqueous solution, depending on the method of their manufacture or processing. These products have good solubility in water and have a viscosity of 2.0 to 100.0 cSt (at 20° C. and 20% solid content). The graft polymers (component a) according to the invention and their manufacture are disclosed in German Patent Application P 43 38 867.1. As the second component b) essential to the invention, the flow improving agents according to the invention contain casein, the known commercial types being able to be used, with no problems.

The weight ratio of component a) (graft polymer) to component b) (casein) can vary widely, this ratio being established preferably at 10:1 to 1:10. On account of their good liquefying action the flow improving agents according to the invention are outstandingly suitable as additives for all binder suspensions containing cement, such as mortar, concrete, cement slurries, etc. What has proven especially advantageous is the use of the agents according to the invention for the liquefaction of self-leveling smoothing compositions such as flow coats, where their good compatibility with casein has an especially positive effect. In this case the flow improving agents are added in an amount of 0.01 to 10 wt.-%, preferably 0.1 to 5 wt.-% with respect to the cement content of the particular inorganic binder suspensions, which can contain additives (sand, gravel) or fillers (calcium carbonate, quartz sand) as well as additives in the form of agents to delay setting, dispersants or thickeners in addition to the binder (cement, calcium hydrate).

The flow improving agents according to the invention have, in this case, the advantage that the flowing ability is considerably improved, in comparison for example to casein (alone), and the improved flowing ability is retained over a longer period of time.

EXAMPLES OF THE PREPARATION OF THE GRAPH POLYMERS

Preparation Example 1 a) Graft Polymerization

In a three-necked flask provided with a KPG stirrer, reflux condenser and thermometer, 60.0 g of poly(ethylene/propylene)-glycol-mono-(3-sulfopropyl)-ether-sodium salt (average MW 1400) is placed with 37.9 g (0.38 mol) of maleic acid anhydride. Then the mixture is heated with stirring to 80° C. After a homogeneous solution has developed, 1.2 g of tert.-butyl-peroxy-3,5,5-trimethyl hexanoate (TBPTH) is added as radical starter and the solution is heated to 140° C. After one hour of reaction another 1.2 g of TBPTH is added. This procedure is repeated two times. After the addition of the radical starter has ended, stirring is continued for an additional hour at 140° C.

b) Derivatization

Then 70.0 g of ethylene glycol monomethyl ether (average MW 750) is added to the highly viscous mixture and it is heated for 1 hour at 140° C. Immediately thereafter the mixture is allowed to cool to room temperature and neutralized with about 125.0 g of caustic soda solution (10%), the temperature being held below 30° C. by cooling. The clear, dark red solution obtained shows, at a solid content of 59.9 wt.-%, a pH of 7.7 and a viscosity at 20° C. of 4.3 cSt as a 20% solution.

Preparation Example 2 a) Graft Polymerization

The graft polymerization of 50.0 g of polyethylene glycol (average MW 4000) is performed with 29.4 g (0.30 mol) of maleic acid anhydride and 6×1.0 g of tertbutyl-peroxy-2-ethyl-hexanoate (TBPEH) at 110° C. as described in Preparation Example 1.

b) Derivatization

Then 10.0 g (0.05 mol) of ethylene glycol monomethyl ether (average MW 200) is added to the highly viscous reaction mixture and heated at 140° C. for 60 minutes. Immediately thereafter the mixture is allowed to cool to room temperature and 29.2 g (0.15 mol) of sulfanilic acid sodium salt dissolved in 60.0 ml of water is added to the reaction mixture. Then neutralization is performed with vigorous stirring with about 120.0 g of caustic soda solution (10%), the temperature being kept below 30° C. by cooling. The clear, dark red solution obtained, has a solid content of 44.4 wt.-%, a pH of 7.9 and a viscosity of 6.7 cSt at 20° C. as a 20% solution.

Preparation Example 3

Graft Polymerization

The graft polymerization of 75.0 g of polyethylene glycol (average MW 1020) with 47.4 g (0.48 mol) of maleic acid anhydride and 3×1.5 g of dicumyl peroxide (DCP) is performed at 140° C. by the procedure described in Preparation Example 1.

b) Derivatization

Then 90.0 g (0.12 mol) of ethylene glycol monomethyl ether (average MW 750) is added to the highly viscous reaction mixture, and the mixture is heated for 2 hours at 140° C. Immediately thereafter it is cooled to room temperature and neutralized with about 215.0 g of caustic soda solution (10%), the temperature being held below 30° C. by cooling. The clear, red solution obtained, with a solid content of 49.6 wt.-%, has a pH of 7.4 and a viscosity at 20° C of 6.4 cSt as a 20% solution.

Preparation Example 4 a) Graft Polymerization 55.0 g of polypropylene glycol (average MW 2020) and 34.6 g (0.35 mol) of maleic acid anhydride are placed in a 3-neck flask provided with a KPG stirrer, reflux condenser and thermometer. Then the mixture is heated with stirring to 80° C. After a uniform solution has developed, 1.1 g of TBPEH is added as radical starter and the solution is heated to 110° C. After one hour of reaction time, 1.1 g of TBPEH is again added. This procedure is repeated for a total of four times. After the addition of the radical starter stirring continues for another hour at 110° C. The highly viscous reaction mixture is then dissolved in 88 ml of DMF and cooled to room temperature (solution 1).

b) Derivatization 35.8 g of caustic soda solution (20%) and 30.5 g (0.17 mol) of sulfanilic acid are placed in a separate glass beaker and stirred until a clear solution forms (Solution 2). The derivatization is performed by dripping Solution 1 into Solution 2, Solution 1 and 132.0 g of caustic soda solution (10%) being added simultaneously over a period of 30 minutes so that the pH of the reaction mixture increases from about 5.5 initially to 7.0 to 8.0 after addition is ended, while the temperature is maintained in the range from 30 to 40° C. After stirring continued for 30 more minutes the reaction mixture is concentrated in vacuo until dry. The yellow powder that is obtained, when prepared as a 20% aqueous solution, has a pH of 7.5 and a viscosity of 6.1 cSt at 20° C.

Preparation Example 5 a) Graft Polymerization 50.0 g of polypropylene glycol (average MW 2020) and 4.5 g (0.45 mol) of succinic acid anhydride are placed in a three-neck flask provided with a KPG stirrer, a reflux condenser and a thermometer. Then the mixture is stirred while heating to 120° C. and 31.6 g (0.32 mol) of maleic acid anhydride is added. After a homogeneous solution has formed, 1.0 g of TBPEH is added as radical starter, and the solution is heated to 140° C. After an hour of reaction another 1.0 g of TBPEH is added. This procedure is repeated twice. After the addition of the radical starter has ended stirring is continued for another hour at 140° C.

b) Derivatization

Then 60.0 g of ethylene glycol monomethyl ether (average MW 750) is added to the highly viscous reaction mixture and the mixture is heated for 2 hours at 140° C.

Thereafter it is allowed to cool to room temperature and neutralized with about 125 g of caustic soda solution (10%), while the temperature is kept below 30° C. by cooling. The clear, dark red solution obtained has a pH of 7.4 at a solid content of 54.3 wt.-% and a viscosity at 20° C. of 4.7 cSt in a 20% solution.

Preparation Example 6 a) Graft Polymerization 55.0 g of polypropylene glycol (average MW 620) and 34.6 g (0.35 mol) of maleic acid anhydride are placed in a three-neck flask provided with a KPG stirrer, a reflux condenser and a thermometer. Then the mixture is heated with stirring at 80° C. After a homogeneous solution has formed, 1.1 g of TBPEH is added as radical starter and the solution is heated to 110° C. After an hour of reaction another 1.1 g of TBPEH is added. This procedure is repeated four times in all. After the addition of the radical starter has ended, stirring is continued for another hour at 110° C. The highly viscous reaction mixture is then dissolved in 88 ml of DMF and cooled to room temperature (Solution 1).

B) Derivatization

In a separate glass beaker 35.8 g of caustic soda solution (20%) and 22.1 g (0.17 mol) of taurine are stirred until a clear solution is formed (Solution 2).

The derivatization is performed by dripping Solution 1 into Solution 2, solution 1 and 132.0 g of caustic soda solution (10%) being added simultaneously over a period of 30 minutes such that the pH of the reaction mixture increases from about 5.5 initially to 7.0–8.0 after the addition is ended, the temperature being kept in the range of 30 to 40° C. After stirring has continued for another 30 minutes the reaction mixture is concentrated in vacuo until dry. The yellow powder obtained has, in a 20% aqueous solution, a pH of 7.5 and a viscosity at 20° C. of 3.53 cSt.

Example of Application

The examples explain the liquefying action of mixtures of a commercial casein (Havero 120 mesh) with a polyalkylene glycol maleic acid anhydride graft polymer maleic acid anhydride). For comparison, combinations of casein with melamine-formaldehyde-sulfite products and naphthalene-formaldehyde-sulfite condensation products are listed in Table 1.

The following mixture was chosen as a self-leveling floor leveling composition:

| | |
|---|---|
| Calcium carbonate 70 μm | 5.0 wt.-% |
| Antifoamer Agitan P 800 | 0.1 wt.-% |
| Lime hydrate | 3.0 wt.-% |
| Methyl cellulose 100–300 cps | 0.1 wt.-% |
| Portland cement PC 45 F | 35.0 wt.-% |
| Quartz Powder 40 μm | 7.0 wt.-% |
| Quartz sand 0.1–0.3 mm | 38.0 wt.-% |
| High alumina cement | 7.0 wt.-% |
| Trisodium citrate | 0.3 wt.-% |
| VINNAPAS dispersion powder RE 523 Z | 4.0 wt.-% |
| Casein/graft polymer | 0.5 wt.-% |
| (Water for mixing 24 wt. %) | 100.0 wt.-% |

The preparation and testing of the floor leveling composition was performed on the basis of the method described by L. M. Meyer and W. F. Perenchio in "Concrete International" (1979, vol. 1, p. 36), in which the floor leveling composition is subjected to a so-called "mini-slump test" in order thereby to judge the liquefying action of an additive. To perform the tests the floor leveling compositions were stirred to form a homogeneous suspension with a water:cement ratio of 0.24, and tested by the said method.

Table 1

Self-spreading Leveling Composition

It is to be seen in this table that the continuous replacement of casein by graft polymer No. 1 does not result in any decrease in the flow measurement, i.e., casein and graft polymer are compatible with one another over the entire range in any ratio. In contrast, the replacement of casein with an MSF or an NSF resin results in a rapid reduction of liquefying action, i.e., the two components are incompatible.

| Ratio of ad mixture casein: flow imp. agt. | MEL- MENT | MEL- CRET | No. 1 | No. 2 | No. 3 | No. 4 | No. 5 | No. 6 |
|---|---|---|---|---|---|---|---|---|
| | F 10[1] | F 500[2] | | | | | | |
| 100:0 | 25.2 | 25.2 | 25.2 | 25.2 | 25.2 | 25.2 | 25.2 | 25.2 |
| 80:20 | 22.3 | 20.8 | 25.4 | 24.8 | 24.9 | 25.1 | 25.2 | 24.9 |
| 50:50 | 20.3 | 16.3 | 25.4 | 24.7 | 25.0 | 25.0 | 25.3 | 24.8 |
| 20:80 | 20.7 | 14.8 | 25.4 | 24.9 | 25.0 | 25.0 | 25.2 | 24.7 |
| 0:100 | 16.3 | 12.6 | 24.8 | 24.8 | 24.9 | 24.9 | 25.1 | 24.7 |

Amount of liquefier used: 0.5 wt.-%
MELMENT F 10 by SKW Trostberg (Melamine-formaldehyde-sulfite condensation product/MFS)
MELCRET 500 F of SKW Trostberg (Naphthalene-formaldehyde-sulfite condensation product/NSF)

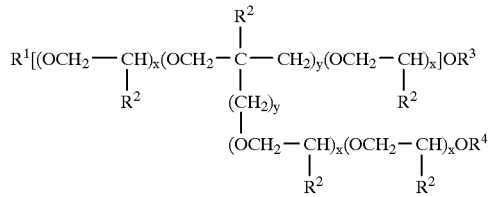

wherein $R^1 =$ —H, —$C_nH_{2n+1}$, —$C_6H_4$—$C_nH_{2n+1}$,

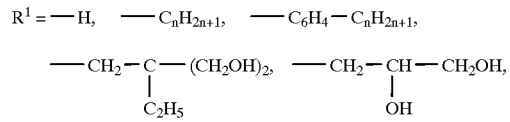

—$(CH-R^2)_m NHR^2$, —$(CH-R^2)_m OH$,

—$(CH-R^2)_m$—COOH, —CO—$R^5$

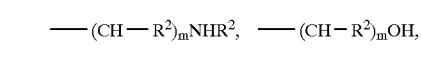

$R^3 =$ —H, —$C_nH_{2n+1}$, —$C_mH_{2m}$—$SO_3Na$,

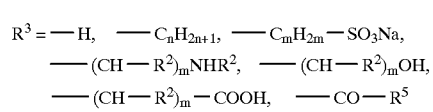

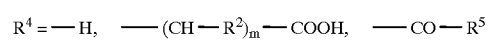

-continued

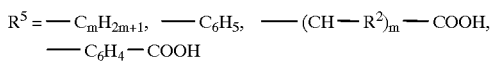

n = 1-18   m = 1-5   x = 2-200   y = 0,1

What is claimed is:

1. A flow improving agent for a binder suspension containing cement comprising:

a) a graft polymer which has been prepared by radical grafting of a polyalkylene oxide of the general formula (I)

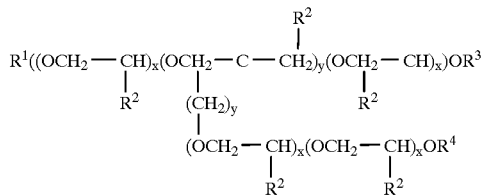

wherein

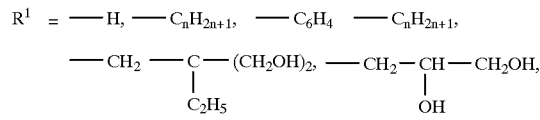

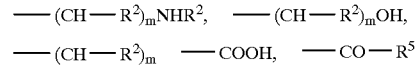

$R^2$ = —H, —CH$_3$, —C$_2$H$_5$

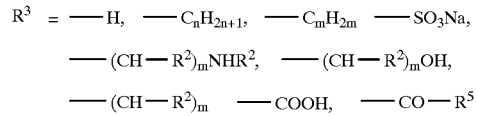

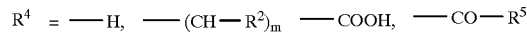

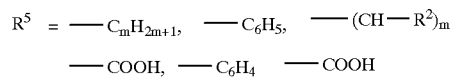

— COOH, — C$_6$H$_4$ — COOH n = 1–18   m = 1–5   x = 2–200   y = 0 or 1 with an ethylenically unsaturated mono- or dicarboxylic acid or its anhydride, followed by derivatization with a primary or secondary amine and/or alcohol to form an amide and/or ester, respectively, and b) casein.

2. The flow improving agent of claim 1 wherein the polyalkylene oxide is polyethyleneglycol and/or polypropyleneglycol or co-polymers thereof.

3. The flow improving agent of claim 1 wherein the polyalkylene oxide comprises polyethylenetriol and/or polypropylenetriol or co-polymers thereof.

4. The flow improving agent of claim 1 wherein the ethylenically unsaturated mono- or dicarboxylic acid is selected from the group consisting of maleic acid, fumaric acid, itaconic acid, acrylic acid, and methacrylic acid.

5. The flow improving agent of claim 1 wherein the carboxylic acid anhydride is maleic acid anhydride or itaconic acid anhydride.

6. The flow improving agent of claim 1 wherein the weight ratio of polyalkylene oxide to ethylenically unsaturated mono- or dicarboxylic acid or the anhydride thereof is from 98:2 to 20:80.

7. The flow improving agent of claim 1 wherein the grafting is at a temperature of 50 to 180° C.

8. The flow improving agent of claim 1 wherein the ethylenically unsaturated mono- or dicarboxylic acid or the anhydride thereof is converted partially to the salt form by reaction with a base after the grafting.

9. The flow improving agent of claim 1 wherein a primary or secondary amine with an aliphatic, araliphatic, aromatic, or heterocyclic moiety is used for the derivatization.

10. The flow improving agent of claim 9 wherein the aliphatic moiety is a saturated or unsaturated, optionally branched, hydrocarbon moiety with 1 to 18 carbon atoms.

11. The flow improving agent of claim 9 wherein the moieties of the primary or secondary amine have at least one functional group selected from the group consisting of —OH, —OR, —NH$_2$, —NR$^2{}_2$, —SO$_3$H, —SO$_3$Na, —COOH, and —COONa.

12. The flow improving agent of claim 1 wherein the derivatization is with a primary or secondary alcohol having an aliphatic, araliphatic, cyclic, or aromatic moiety.

13. The flow improving agent of claim 12 wherein the aliphatic moiety is a saturated or unsaturated, optionally branched, hydrocarbon moiety with 1 to 18 carbon atoms.

14. The flow improving agent of claim 12 wherein a polyalkyleneglycol mono alkylether

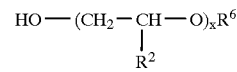

or polyalkyleneglycol monoalkylaryl ether with $R^6$=—$C_nH_{2n+1}$, —$C_6H_4$—$C_nH_{2n+1}$ wherein n=1–10 and x=1–100 is used for the derivatization.

15. The flow improving agent of claim 1 wherein the molar ratio of ethylenically unsaturated mono- or dicarboxylic acid or the anhydride thereof to primary or secondary amine or alcohol is from 99:1 to 50:50.

16. The flow improving agent of claim 1 wherein the derivatization is performed in water at a temperature of 20 to 200° C.

17. The flow improving agent of claim 1 wherein a radical or nucleophilic addition onto the ethylenically unsaturated groups in the graft polymer of the carboxylic acid derivatives is performed prior to, or after, the derivatization.

18. The flow improving agent of claim 1 wherein the nucleophilic addition is performed by reaction with sodium sulfite.

19. The flow improving agent of claim 17 wherein the radical addition is performed by reaction with vinyl or acryl derivatives.

20. The flow improving agent of claim 19 wherein the vinyl derivative is selected from the group consisting of N-vinylpyrrolidone, vinylsulfonic acid, and styrene.

21. The flow improving agent of claim 19 wherein the acryl derivative is selected from the group consisting of acrylic acid, acrylic acid amide, and acrylic acid ester.

22. The flow improving agent of claim 17 wherein a sodium sulfite, vinyl, or acryl derivative is used in an amount of 0.1 to 50 mole-% with respect to the amount of the ethylenically unsaturated mono- or dicarboxylic acid or anhydrides thereof.

23. The flow improving agent of claim 17 wherein the radical or nucleophilic addition is performed in an aqueous medium at a temperature of 20 to 120° C.

24. The flow improving agent of claim 1 wherein the weight ratio of graft polymer (component a) to casein (component b) is 10:1 to 1:10.

25. A self-leveling composition comprising a binder suspension of cement and the flow improving agent of claim 1.

26. The self leveling composition of claim 25, comprising from 0.01 to 10 wt percent of flow improving agent relative to cement content in said binder suspension.

27. The self leveling composition of claim 26, comprising from 0.1 to 5 wt. % of said flow improving agent.

* * * * *

UNITED STATES PATENT AND TRADEMARK OFFICE
CERTIFICATE OF CORRECTION

PATENT NO.  : 6,150,437
DATED       : November 21, 2000
INVENTOR(S) : Wutz et al.

Page 1 of 1

It is certified that error appears in the above-identified patent and that said Letters Patent is hereby corrected as shown below:

Column 3,
Line 8, after "hexanoate" insert -- ) --.

Column 6,
Line 2, before "Graft" insert -- a) --.

Column 8,
Line 40-65, delete formula.

Signed and Sealed this

Fifteenth Day of January, 2002

Attest:

JAMES E. ROGAN
Director of the United States Patent and Trademark Office

Attesting Officer